(12) United States Patent
Switalski (10) Patent No.: US 10,173,569 B2
(45) Date of Patent: Jan. 8, 2019

(54) HEAD RESTRAINT ASSEMBLY

(71) Applicant: WINDSOR MACHINE AND STAMPING (2009) LTD., Windsor (CA)

(72) Inventor: William Switalski, Windsor (CA)

(73) Assignee: WINDSOR MACHINE AND STAMPING (2009) LTD., Windsor (CA)

( * ) Notice: Subject to any disclaimer, the term of this patent is extended or adjusted under 35 U.S.C. 154(b) by 141 days.

(21) Appl. No.: 15/358,857

(22) Filed: Nov. 22, 2016

(65) Prior Publication Data

US 2017/0151896 A1 Jun. 1, 2017

Related U.S. Application Data

(60) Provisional application No. 62/260,860, filed on Nov. 30, 2015.

(51) Int. Cl.
*B60N 2/853* (2018.01)
*B60N 2/847* (2018.01)
*B60N 2/68* (2006.01)

(52) U.S. Cl.
CPC ............ *B60N 2/853* (2018.02); *B60N 2/682* (2013.01); *B60N 2/847* (2018.02)

(58) Field of Classification Search
None
See application file for complete search history.

(56) References Cited

U.S. PATENT DOCUMENTS

| | | | | |
|---|---|---|---|---|
| 5,906,414 | A | * | 5/1999 | Rus .................. B60N 2/856 297/408 |
| 6,499,805 | B1 | | 12/2002 | Watadani |
| 8,979,203 | B1 | * | 3/2015 | Sutter, Jr. ............ B60N 2/4847 297/408 |
| 9,132,756 | B1 | | 9/2015 | Witte et al. |
| 2005/0093349 | A1 | * | 5/2005 | Low ..................... B60N 2/841 297/216.12 |
| 2008/0290700 | A1 | * | 11/2008 | Paluch ................. B60N 2/853 297/95 |
| 2011/0221250 | A1 | | 9/2011 | Little |

(Continued)

FOREIGN PATENT DOCUMENTS

| | | |
|---|---|---|
| CN | 1692031 A | 11/2005 |
| CN | 202806460 U | 3/2013 |
| CN | 203063732 U | 7/2013 |

(Continued)

OTHER PUBLICATIONS

Extended European Search Report and Written Opinion regarding related EP App. No. 16200953.4; dated Apr. 4, 2017.

(Continued)

*Primary Examiner* — David E Allred
(74) *Attorney, Agent, or Firm* — Cantor Colburn LLP (57) ABSTRACT

A head restraint assembly includes a one-piece armature including a cross member having an offset portion. Also included is a ratcheting mechanism having a pivot plate directly and fixedly engaged with the offset portion of the cross member. Further included is a pivot pin extending through an aperture defined by the pivot plate and tangentially contacting a forward portion of the one-piece armature.

13 Claims, 10 Drawing Sheets

(56) References Cited

U.S. PATENT DOCUMENTS

2015/0159721 A1* 6/2015 Okubo .................... B60N 2/80
                                                297/404
2017/0120786 A1* 5/2017 Cao ......................... B60N 2/80

FOREIGN PATENT DOCUMENTS

CN         204432451 U    7/2015
KR       20050122004 A   12/2005

OTHER PUBLICATIONS

Office Action regarding related CN App. No. 201611078415.6; dated Jul. 25, 2018; 5 pgs.

* cited by examiner

HEAD RESTRAINT ASSEMBLY

CROSS-REFERENCE TO RELATED APPLICATION

This patent application claims priority to U.S. Provisional Application No. 62/260,860, filed Nov. 30, 2015, which is incorporated herein by reference in its entirety.

FIELD OF THE INVENTION

The subject matter disclosed herein relates to head restraint assemblies.

BACKGROUND

Many vehicles, such as automobiles, include a headrest or head restraint atop an occupant's seat and in a position adjacent the occupant's head. Head restraints are typically cushioned for comfort, are height adjustable, and most are commonly finished in the same material as the rest of the seat. Design and assembly of head restraints require consideration of assembly structural integrity. Several challenges are involved with ensuring the desired structural integrity.

BRIEF DESCRIPTION OF THE INVENTION

According to an embodiment of the invention, a head restraint assembly including an armature that includes a cross member having an offset portion. Also included is a frame. Further included is a first side structure operatively coupled to the frame. Yet further included is a second side structure operatively coupled to the frame. Also included is an upper ratchet member rigidly coupled to at least one of the first side structure and the second side structure. Further included is a pivot plate having a forked interface, the forked interface engaged with the offset portion of the cross member. Yet further included is a lower ratchet member operatively coupled to the pivot plate and selectively engaged with the upper ratchet member. Also included is a pivot pin extending through respective apertures of the pivot plate, the first side structure and the second side structure, the pivot pin tangentially contacting a forward portion of the armature.

According to another embodiment of the invention, a head restraint assembly includes a one-piece armature including a cross member having an offset portion. Also included is a ratcheting mechanism having a pivot plate directly and fixedly engaged with the offset portion of the cross member. Further included is a pivot pin extending through an aperture defined by the pivot plate and tangentially contacting a forward portion of the one-piece armature.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION

Figure 1:
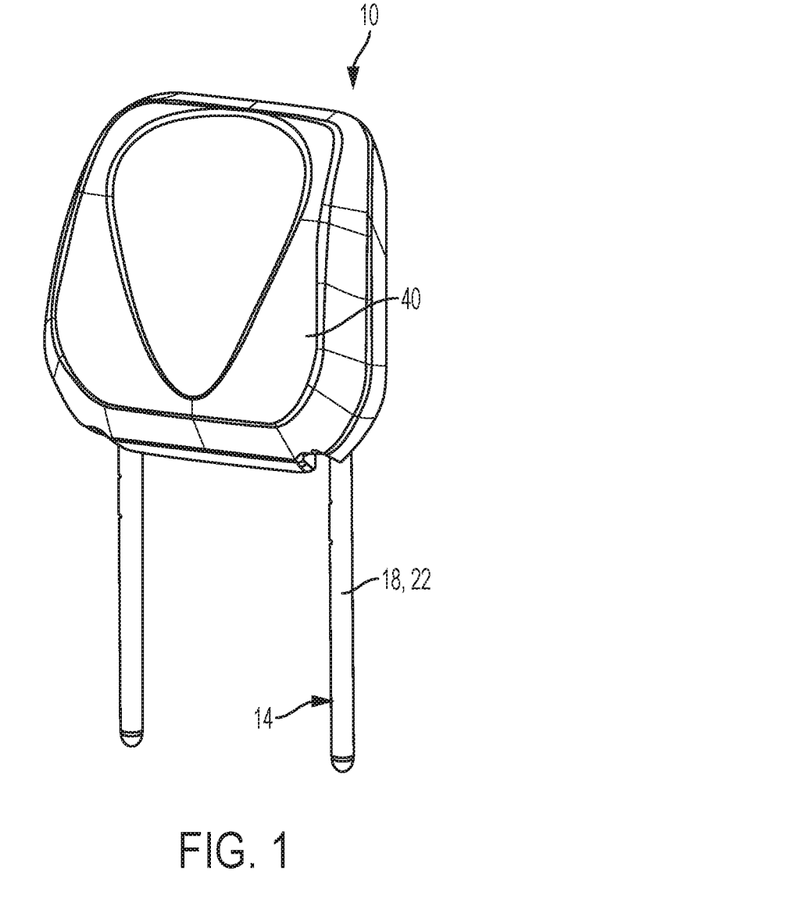
FIG. 1 is a front perspective view of a head restraint assembly.
Figure 2:
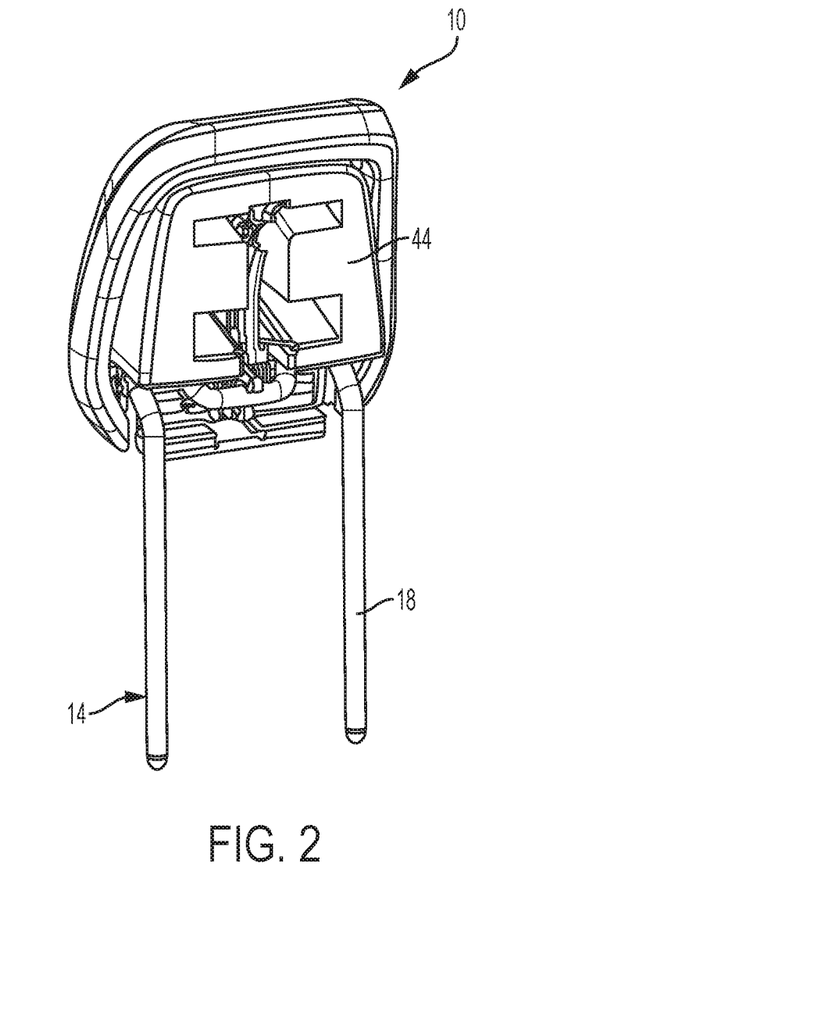
FIG. 2 is a rear perspective view of the head restraint assembly with a cover removed, illustrating various components of the head restraint assembly shrouded within a core.

Referring to FIGS. 1 and 2, a head restraint assembly 10 is schematically depicted. The head restraint assembly 10 includes a base portion 14 (which may also be referred to as an "armature") that is mountable to a vehicle seat (not shown), and, more specifically, to the upper portion of the seatback of the vehicle seat. In the embodiment depicted, the base portion 14 is formed from a single piece of metal and includes two parallel post portions 18 that are mounted, or mountable, to the top of the seatback of the vehicle seat, as understood by those skilled in the art. Each of the post portions 18 includes a respective elongated, straight portion 22. Each of the straight portions 22 extends into a respective hole formed in the top of the seatback to attach the head restraint assembly 10 to the vehicle seat.

The head restraint assembly 10 further includes a head restraint 40 operatively connected to base portion 14. In the embodiment depicted, the head restraint 40 includes a frame 44 that shrouds the internal mechanism of the head restraint 40. In one embodiment, the frame 44 is a protective expandable polyurethane (EPP) core. The head restraint 40 also includes cushion (not shown) and a flexible trim (not shown) that are mounted with respect to the frame 44 for movement therewith. The head restraint cushion is comprised of a soft foam or a like material to provide a cushion between the head of a human occupant to the vehicle seat and the head restraint frame 44. The head restraint trim covers at least part of the cushion and the frame to enhance the aesthetics and comfort of the head restraint. Exemplary cover materials include cloth, vinyl, leather, etc.

Figure 3:
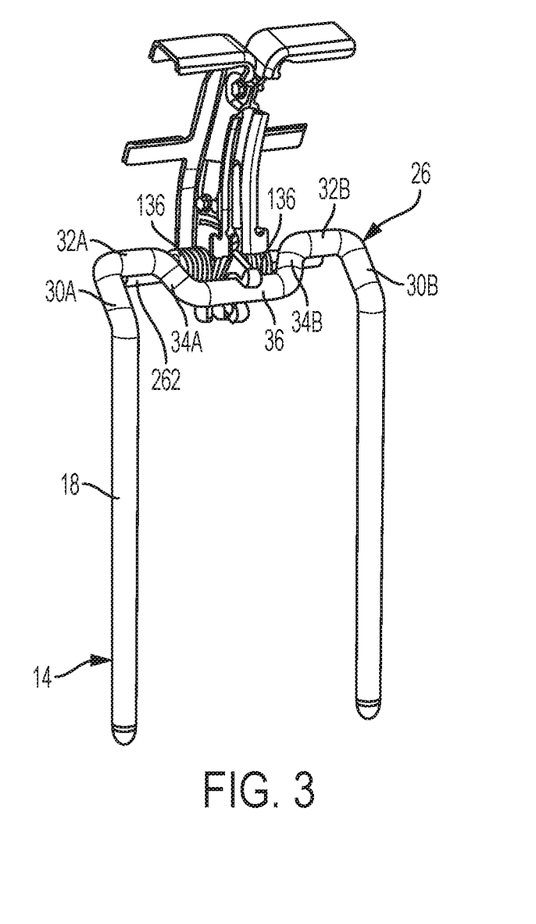
FIG. 3 is a rear, perspective view of the ratcheting mechanism with the core removed.

Referring to FIG. 3, the base portion 14 also includes a cross-member portion 26 that interconnects the two post portions 18. When the base portion 14 is connected to an upright vehicle seat, the post portions 18 are generally vertical, and the cross-member portion 26 is generally horizontal. The cross-member portion 26 includes segments 30A, 30B, 32A, 32B, 34A, 34B, and 36. When the base portion 14 is connected to an upright vehicle seat, each of segments 30A, 30B extends forwardly from an upper end of a respective one of the post portions 18, each of segments 32A, 32B extends transversely from a respective one of the segments 30A, 30B, each of segments 34A, 34B extends rearward from a respective one of the segments 32A, 32B, and segment 36 extends transversely to interconnect segments 34A and 34B and runs parallel to segments 32A, 32B. Segments 32A, 32B are coaxial with each other and segments 34A, 34B, 36 form a U-shaped bend or offset in the cross-member portion 26 between linear, coaxial segments 32A, 32B. The above-described orientation of the cross-member portion is merely illustrative. Additionally, more or fewer segments may be included.

Figure 4:
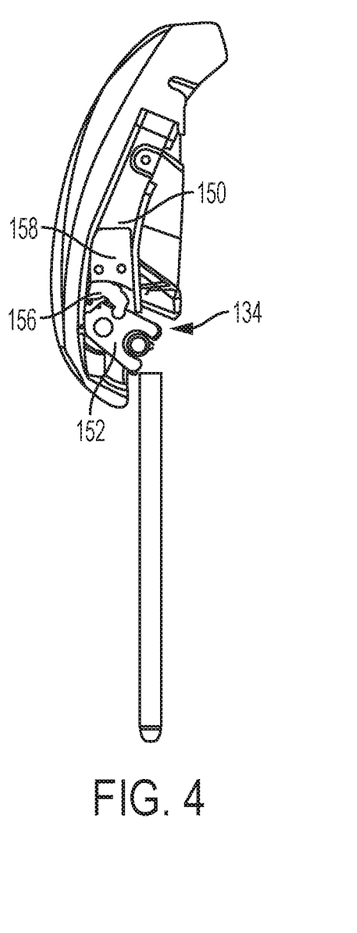
FIG. 4 is a vertical center section view of the head restraint assembly, illustrating the internal ratcheting mechanism assembly.
Figure 5:
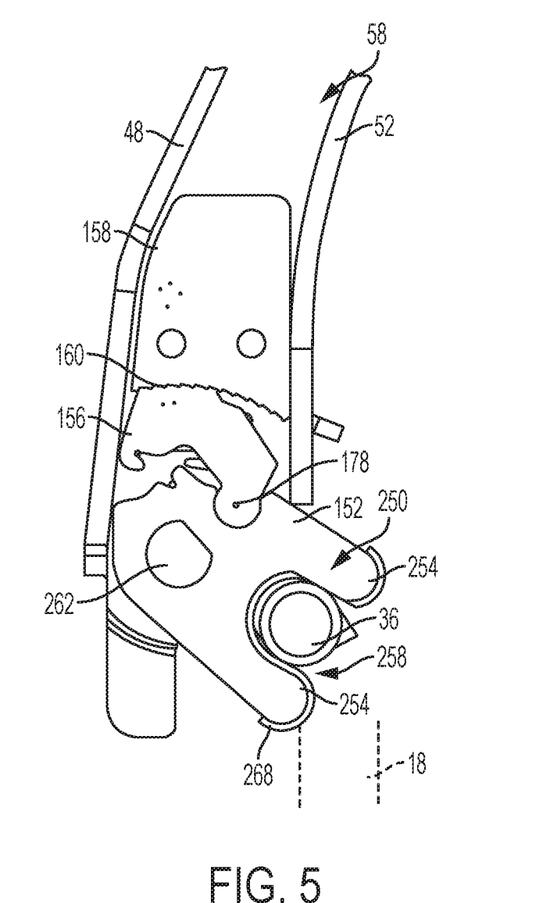
FIG. 5 is an enlarged vertical center section view of the internal ratcheting mechanism.

Referring to FIGS. 4 and 5, a ratcheting pivot mechanism 134 includes pivoting body 150 and a lower stamping pivot plate 152 that may be pivotally interconnected using a pivot pin 262. A movable lower ratchet member 156 is pivotally connected to the lower stamping pivot plate 152, and is selectively positionable by the upper ratchet member 158 that is affixed or integrated into the pivoting body 150 (for clarity, upper ratchet member 158 may herein be referred to as the "fixed ratchet member 158"). When the movable lower ratchet member 156 is engaged with the fixed ratchet member 158 (i.e., when the teeth 160 of the movable ratchet member 156 contact the teeth 161 of the fixed ratchet member 158), the pivoting body 150 (and coupled head rest frame 44) may be permitted to rotate in a forward direction, but are not permitted to rotate in a rearward direction. To facilitate this one way motion, each ratchet 156, 158 has respective teeth 160, 161 that may interconnect with the teeth of the opposing ratchet and may advance in a step-wise manner.

The pivot mechanism further includes a spring 162 (FIG. 8) disposed between the lower stamping pivot plate 152 and the movable lower ratchet member 156. As will be described in greater detail below, the spring 162 may be configured and/or positioned in a manner where it applies separation load to the movable lower ratchet member 156 from the lower stamping pivot plate 152, promoting the lower ratchet member 156 to engage with the fixed upper ratchet member 158. And when the spring 162 is positioned where it applies a reversed separation load to the movable lower ratchet member 156 from the lower stamping pivot plate 152, promoting the lower ratchet member 156 to disengage with the fixed upper ratchet member 158 (i.e., when the teeth 160 of the movable lower ratchet member 156 loses contact with the teeth 160 of the fixed upper ratchet member 158). As such, there may be an over center position where the direction of the biasing provided by the spring 162 may switch between an engaging and disengaging direction.

The pivoting body 150 houses all the internal mechanism components within cavity 58, created by a series of formed offset assembly surfaces flanked by front and rear strength flanges 48, 52 such that the pivoting body 150 moves in unison with the frame 44 as it rotates. The pivoting body 150 may be used to toggle the movable lower ratchet member 156 between an engaged state and a disengaged state while articulating through its full pivoting range. To accomplish this toggling, the movable lower ratchet member 156 may include a reset emboss pin or the like (not shown) that may be rigidly coupled with the lower ratchet member 156, and that may interact with a reset window defined within the pivoting body 150. As the pivoting body 150 articulates relative to the lower stamping pivot plate 152, the reset pin may contact the perimeter of the reset window, which may apply a selective force to the pin. As such, the interaction between the reset window and the reset pin may urge the movable lower ratchet member 156 to move between the engaged position and the disengaged position. In alternative embodiments, other mechanical interference means may be used to transition the movable lower ratchet member 156 between the engaged position and the disengaged position. Such interference mechanisms, for example, may include the use of catches, pins, rockers, or other similar devices known in the art.

In operation, when the movable lower ratchet member 156 is engaged with the fixed upper ratchet member 158, the pivoting body 150 may be free to articulate in a forward direction, however, any movement in a rearward direction may be restrained by the interaction of the gear teeth 160 of the respective ratchet members 156, 158.

The reversible bias of spring 162, which may cause a "toggling" effect of the movable lower ratchet member 156, may result from the geometric arrangement of the spring 162, movable lower ratchet member 156, and lower stamping pivot plate 152. The movable lower ratchet member 156 may pivot with respect to the lower stamping pivot plate 152 at a point 178. Spring 162, such as for example, an omega-shaped spring 162, may then extend between the movable lower ratchet member 156 and the lower stamping pivot plate 152, and may generally exert an opposite, outward force against each respective component.

The spring force applied to the movable lower ratchet member 156 by spring 162 may urge the lower ratchet member 156 to pivot either in an engaging or disengaging direction relative to the pivot point 178, according to its alignment with the radial axis. When the movable lower ratchet member 156 is in an engaged position, the spring force acts on the movable lower ratchet member 156 in a direction that would cause the lower ratchet member 156 to rotate in a clockwise (engaging) direction. When the movable lower ratchet member 156 is in a disengaged position, the spring force is applied in a direction that would cause the lower ratchet member 156 to rotate in a counter-clockwise (disengaging) direction.

With such a spring configuration, there exists a position between the engaged and disengaged position where the spring force may be perfectly aligned with the radial axis, and no biasing force is applied. This "neutral" position is generally an un-stable position and is commonly referred to as the "over-center" position. As such, the movable lower ratchet member 156 in this configuration is bistable—that is, it is stable in two positions: either engaged or disengaged.

The mechanism 134 may be similar to the mechanism shown and described in commonly-assigned U.S. patent application Ser. No. 13/042,818, filed Mar. 8, 2011, (published as 2011/0221250 on Sep. 15, 2011) and which is hereby incorporated by reference in its entirety.

The lower stamping pivot plate 152 includes a forked portion 250 formed by two parallel, protuberant arms 254. The arms 254 define a groove 258 therebetween, and the lower stamping pivot plate 152 is positioned such that segment 36 of the base portion 14 extends through the groove 258. The arms 254 are partially covered by an elastomeric covering material 268 to prevent metal-to-metal contact between the pivot arm 152 and segment 36, and to provide a snug fit between the pivot arm 152 (i.e., arms 254) and segment 36, thereby eliminating rattle. The lower stamping pivot plate 152 does not rotate relative to the base portion 14 when the head restraint 40 is rotated, but lateral movement of the lower stamping pivot plate 152 relative to the base portion 14 is permitted. This interface between the lower stamping pivot plate 152 and the base portion 14, which restricts or prevents relative rotation therebetween, is significantly easier to assemble and manufacture, and is less expensive, than prior art head restraints.

Figure 6:
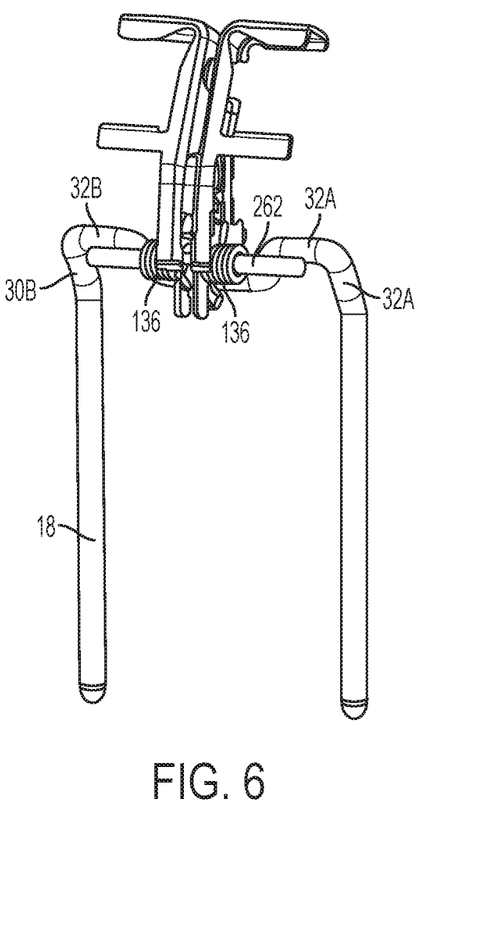
FIG. 6 is a front, perspective view of the ratcheting mechanism with the core removed.
Figure 7:
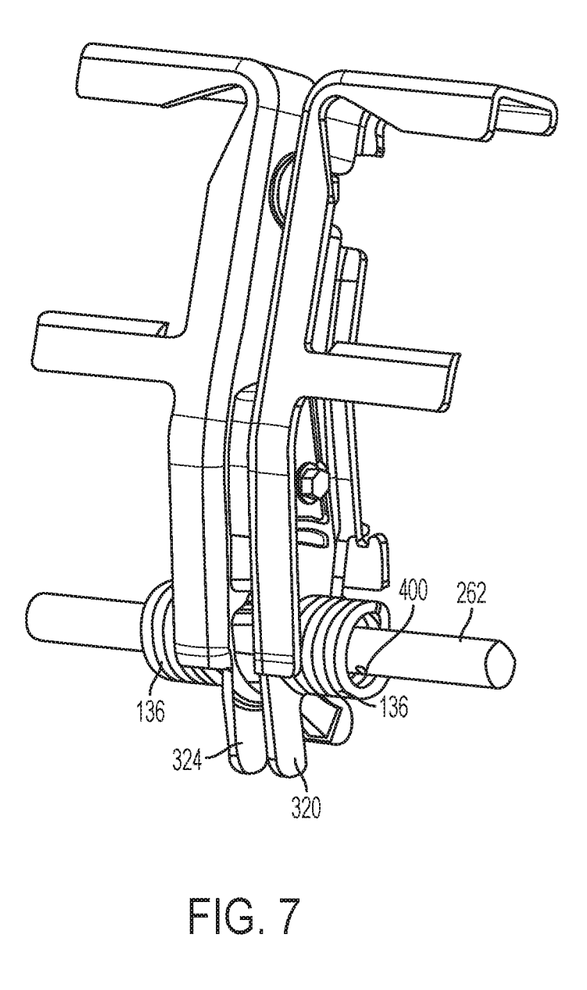
FIG. 7 is a perspective view of the assembled ratcheting mechanism.
Figure 8:
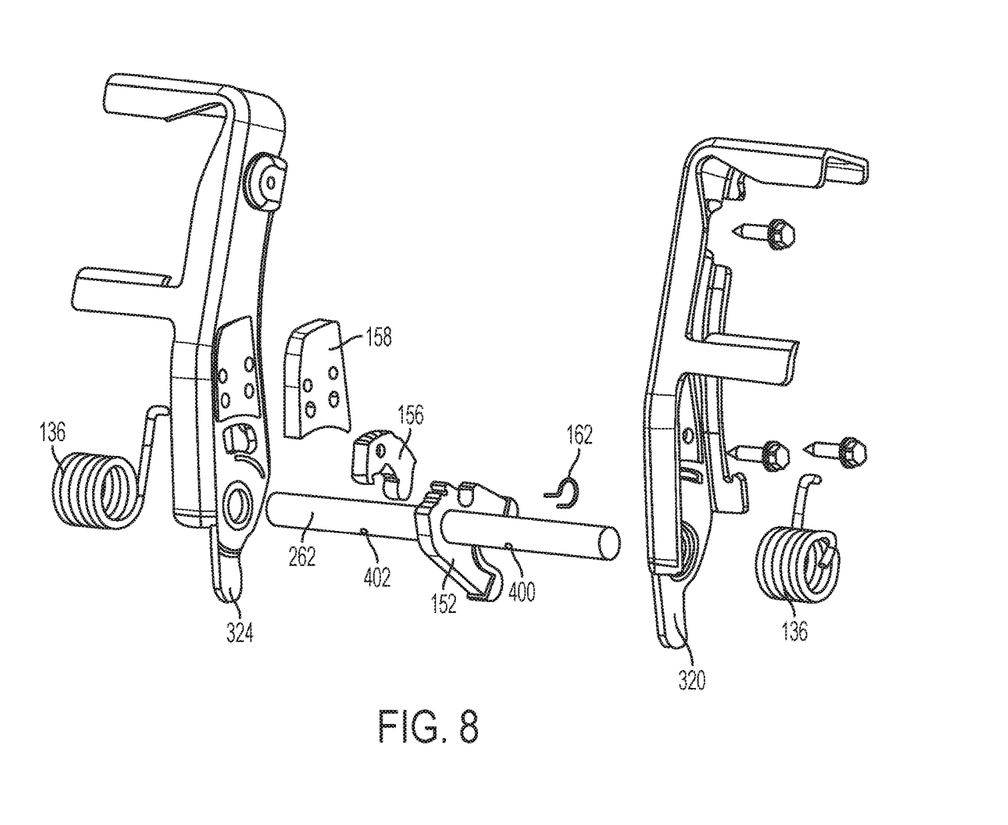
FIG. 8 is a disassembled, perspective view of the ratcheting mechanism.

Referring to FIGS. 6-8, the pivot pin 262 extends through a hole 276 in the lower stamping pivot plate 152 and through holes formed in stampings 320, 324. The pivot pin 262 is operatively and rigidly connected to the base portion 14. More specifically, the pivot pin 262 is rigidly connected to segments 32A and 32B of the base portion 14. As shown, the pivot pin 262 extends outward of segments 34A and 34B of the base portion to connect with segments 32A, 32B. The elongated nature of the pivot pin 262 and the rigid connection to the base portion enhances structural integrity of the overall head restraint assembly. In the illustrated embodiment, the pin is rigidly connected to a forward portion of segments 32A, 32B. It is to be appreciated that connection to upper, lower or rearward portions of these segments is contemplated.

The stampings 320, 324 are the two main side stampings that pivoting body 150 are comprised, and house all the internal mechanism componentry. The upper ratchet member 158, lower ratchet member 156, spring 162, and lower stamping pivot plate 152 are all assembled between the stampings 320, 324. The pivot pin 262 and the hole 276 are not circular, and thus the pivot pin 262 does not rotate with respect to the lower stamping pivot plate 152. The pivot pin 262 defines a first hole 400 located on an outer side of stamping 320 and a second hole 402 on an outer side of stamping 324. The head restraint 40 includes two torsional springs 136; each of the springs 136 is coiled around the pivot pin 262 on a respective side of the stampings 320, 324. Each spring 136 has a respective end disposed within a respective hole 400, 402 to establish connectible rotation of the springs 136 to the pivot pin 262. The springs 136 maintain a rearward bias on the head restraint 40; that is, the springs 136 urge the head restraint 40 in the rearward rotational direction, and are thus referred to as "return springs."

Figure 9:
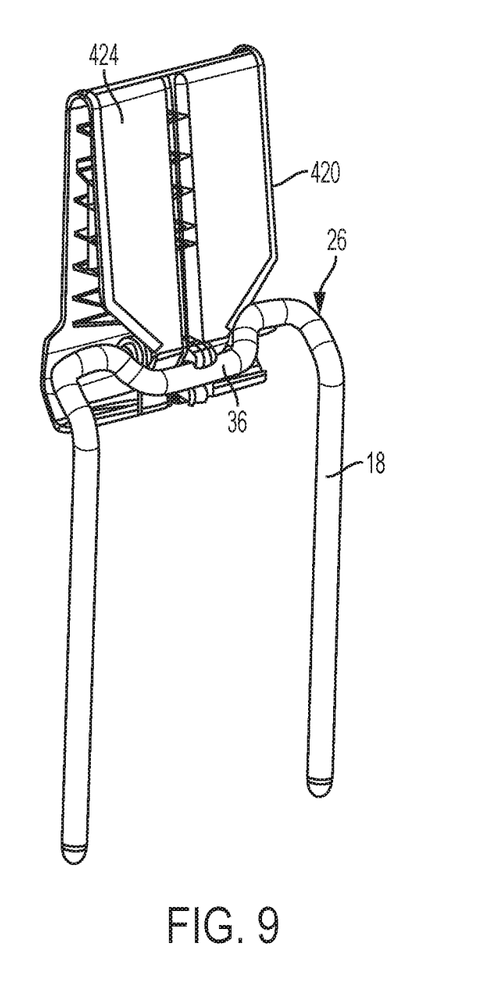
FIG. 9 is a perspective view of the head restraint assembly according to another aspect of the disclosure.
Figure 10:
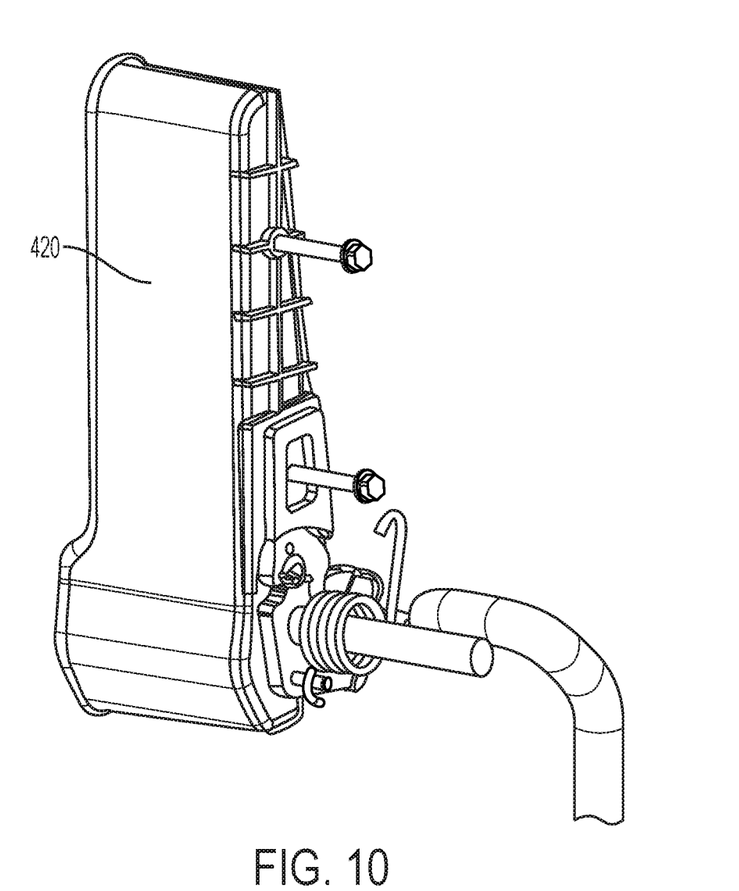
FIG. 10 is a perspective view of the head restraint assembly according to the embodiment illustrated in FIG. 9.

Referring to FIGS. 9 and 10, it is to be understood that the stampings 320, 324 are side structures that are generally referred to as a first side structure and a second side structure herein. The side structures 420, 424 in the illustrated embodiment are formed of plastic structures.

Typical pivoting fore-aft adjustable headrests available today require some kind of welding, riveting or some other means of hard fixing its ratcheting mechanism to the armature or lower sub-assembly 14. The embodiments disclosed herein greatly reduce and/or eliminate all previous mentioned procedures and lowers the overall weight of the headrest at the same time. Welding the lower stamping pivot plate 152 to a lock post and then riveting it to the center pivot shaft and slave leg to create the lower mechanism assembly has been replaced with a modified lower stamping pivot plate 152 and a one piece armature 14.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A head restraint assembly comprising:
    an armature including a cross member having an offset portion;
    a frame;
    a first side structure operatively coupled to the frame;
    a second side structure operatively coupled to the frame;
    an upper ratchet member rigidly coupled to at least one of the first side structure and the second side structure;
    a pivot plate having a forked interface, the forked interface engaged with the offset portion of the cross member;
    a lower ratchet member operatively coupled to the pivot plate and selectively engaged with the upper ratchet member; and
    a pivot pin extending through respective apertures of the pivot plate, the first side structure and the second side structure, the pivot pin tangentially contacting a forward portion of the armature.

2. The head restraint assembly of claim 1, wherein the first side structure and the second side structure are each formed of steel stampings.

3. The head restraint assembly of claim 1, wherein the first side structure and the second side structure are each formed of plastic.

4. The head restraint assembly of claim 1, wherein the lower ratchet member is operatively coupled to the pivot plate with a protrusion of the lower ratchet member mated within a recess defined by the pivot plate.

5. The head restraint assembly of claim 4, further comprising a spring disposed between the pivot plate and the lower ratchet member.

6. The head restraint assembly of claim 5, wherein the spring comprises an omega-shaped spring.

7. The head restraint assembly of claim 5, wherein the spring biases the lower ratchet member and the upper ratchet member into an engaged condition over a first range of positions and into a disengaged condition over a second range of positions.

8. The head restraint assembly of claim 1, further comprising:
    a first spring disposed on an outer side of the first side structure and surrounding the pivot pin; and
    a second spring disposed on an outer side of the second side structure and surrounding the pivot pin, each spring biasing the head restraint in a rotational direction.

9. The head restraint assembly of claim 8, wherein the rotational direction is rearward.

10. The head restraint assembly of claim 8, wherein the first spring and the second spring are each torsional springs.

11. The head restraint assembly of claim 8, wherein the first spring and the second spring each include a first end disposed within an aperture defined by the pivot pin and a second end disposed within an aperture defined by the first side structure or the second side structure.

12. The head restraint assembly of claim 1, wherein the upper ratchet member, the lower ratchet member and the pivot plate are all disposed within inner sides of the first side structure and the second side structure.

13. A head restraint assembly comprising:
    a one-piece armature including a cross member having an offset portion;
    a ratcheting mechanism having a pivot plate directly and fixedly engaged with the offset portion of the cross member;
    a pivot pin extending through an aperture defined by the pivot plate and tangentially contacting a forward portion of the one-piece armature.

* * * * *